United States Patent
Kasai et al.

(10) Patent No.: US 8,476,605 B2
(45) Date of Patent: Jul. 2, 2013

(54) SCINTILLATOR PANEL, METHOD OF PRODUCING SCINTILLATOR PANEL, RADIATION IMAGE DETECTOR AND METHOD OF PRODUCING RADIATION IMAGE DETECTOR

(75) Inventors: Shigetami Kasai, Tokyo (JP); Hiroshi Isa, Tokyo (JP); Makoto Iijima, Kanagawa (JP); Yasushi Nagata, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 56 days.

(21) Appl. No.: 13/379,923

(22) PCT Filed: Mar. 4, 2010

(86) PCT No.: PCT/JP2010/053534
§ 371 (c)(1),
(2), (4) Date: Dec. 21, 2011

(87) PCT Pub. No.: WO2010/150576
PCT Pub. Date: Dec. 29, 2010

(65) Prior Publication Data
US 2012/0097855 A1    Apr. 26, 2012

(30) Foreign Application Priority Data

Jun. 26, 2009 (JP) .................................. 2009-152287
Oct. 27, 2009 (JP) .................................. 2009-246301

(51) Int. Cl.
*G01J 1/58* (2006.01)

(52) U.S. Cl.
USPC ..................................... 250/484.4; 250/483.1

(58) Field of Classification Search
USPC ............. 250/361 R, 367, 483.1, 484.2, 484.4
See application file for complete search history.

(56) References Cited

U.S. PATENT DOCUMENTS 7,482,602 B2 *    1/2009    Shoji et al. ................. 250/483.1

FOREIGN PATENT DOCUMENTS

| JP | 63-215987 | 9/1988 |
| JP | 2003-050298 | 2/2003 |
| JP | 2003-75593 | 3/2003 |
| JP | 2007-232636 | 9/2007 |
| JP | 2008-51793 | 3/2008 |

* cited by examiner

*Primary Examiner* — Mark R Gaworecki
(74) *Attorney, Agent, or Firm* — Lucas & Mercanti, LLP

(57) ABSTRACT

A scintillator panel which has achieved enhanced sharpness and sensitivity is disclosed, comprising on a first support a phosphor layer comprising phosphor columnar crystals formed by a process of vapor phase deposition and containing a parent component of cesium iodide (CsI) and an activator of thallium (Tl), and the phosphor layer comprising a first layer of a CsI layer which is in the bottom portion of the phosphor layer and does not contain any activator of thallium, and on the first layer, a second layer of a CsI—Tl layer which contains the activator of thallium and exhibits not more than 32% of a coefficient of variation of concentration of thallium in the direction of thickness.

11 Claims, 1 Drawing Sheet

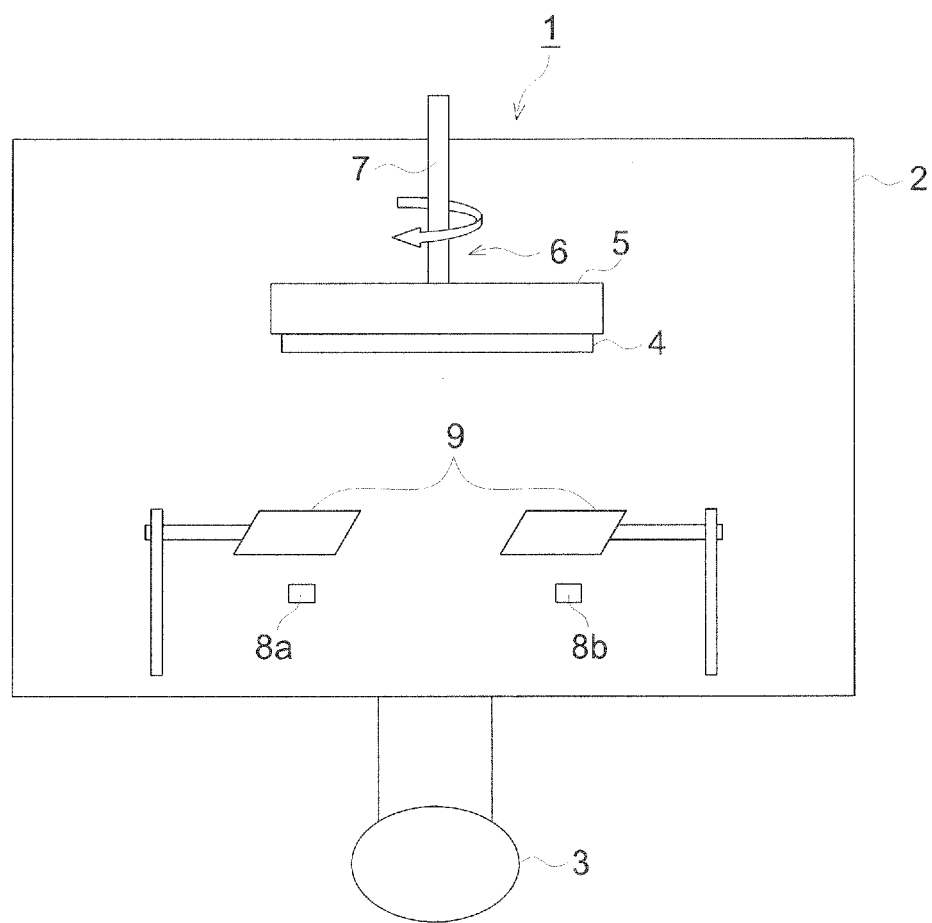

SCINTILLATOR PANEL, METHOD OF PRODUCING SCINTILLATOR PANEL, RADIATION IMAGE DETECTOR AND METHOD OF PRODUCING RADIATION IMAGE DETECTOR

CROSS REFERENCE TO RELATED APPLICATION

This application is a U.S. National Phase Application under 35 USC 371 of International Application PCT/JP2010/053534 filed Mar. 4, 2010, which in turn claimed the priority of Japanese Patent Application Nos. 2009-152287 filed Jun. 26, 2009, and JP2009-246301, filed Oct. 27, 2009, all three of the applications are incorporated by reference herein.

TECHNICAL FIELD

The present invention relates to a scintillator panel, a production method of a scintillator panel, and a radiation image detector and a production method of a radiation image detector, and specifically relates to a scintillator panel capable of obtaining a radiation image improved in sharpness and sensitivity, a production method of the scintillator panel, and a radiation image detector and a production method of the radiation image detector.

TECHNICAL BACKGROUND

There have been broadly employed radiographic images such as X-ray images for diagnosis of the conditions of patients on hospital wards. Specifically, radiographic images using an intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel detector (also denoted simply as FPD). In these apparatuses, digital radiographic images are obtained directly and can be displayed on an image display apparatus such as a cathode tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, the article "Amorphous Semiconductor Usher in Digital X-ray Imaging" described in Physics Today, November, 1997, page 24 and also in the article "Development of a High Resolution, Active Matrix, Flat-Panel Imager with Enhanced Fill Factor" described in SPIE, vol. 32, page 2 (1997).

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the phosphor layer thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of X-rays to visible light. Further, a columnar crystal structure of the phosphor can readily be formed through vapor deposition and its light guide effect inhibits scattering of emitted light within the crystal, enabling an increase of the phosphor layer thickness (as described in Patent document 1).

Cesium iodide (CsI) alone exhibits a relatively low emission efficiency, so that thallium iodide (TlI), as an activator is usually added thereto. For instance, there was disclosed a scintillator panel in which the activator concentration in the face direction of a scintillator layer was higher in the peripheral region than in the central region (as described in Patent document 2). However, there were problems such that the distribution of activator concentration was insufficient and there occurred disorder in the columnar crystal structure, caused by a difference in the crystal structure between thallium iodide (TlI) as an activator and cesium iodide, resulting in deteriorated sharpness and reduced sensitivity.

CITATION LIST

Prior Art Literature

Patent document 1: JP 63-215987 A
Patent document 2: JP 2007-232636 A

SUMMARY OF THE INVENTION

Problems to be Solved

The present invention has come into being in view of the foregoing problems, and accordingly, it is an object of the present invention to provide a scintillator panel which has achieved improved sharpness and sensitivity, a production method of the scintillator panel, and a radiation image detector and a production method of the radiation image detector.

Means for Solving the Problems

The foregoing objects of the present invention can be achieved according to the following constitution:

1. A scintillator panel comprising on a first support a phosphor layer which comprises phosphor columnar crystals formed by a process of vapor phase deposition and containing a parent component of cesium iodide (CsI) and an activator of thallium (Tl), and the phosphor layer comprising a first layer of a CsI layer which is in the bottom portion of the phosphor layer and does not contain any activator of thallium, and further on the first layer, a second layer of a CsI—Tl layer which contains the activator of thallium and exhibits not more than 32% of a coefficient of variation of concentration of thallium in a direction of thickness (in which a coefficient of variation of concentration of the activator of thallium in the direction of thickness is not more than 32%).

2. A radiation image detector comprising a scintillator panel, as described in the foregoing 1 and a light receiving element.

3. A method of producing a scintillator panel, as described in the foregoing 1, the method comprising:

a first layer forming step of heating cesium iodide at a temperature of not less than a melting point of the cesium iodide to evaporate the cesium iodide to form a first layer on the first support, and then, a second layer forming step of heating the cesium iodide at a temperature not less than the melting point of the cesium iodide to evaporate the cesium iodide simultaneously with heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form the second layer on the first layer.

4. A method of producing a scintillator panel comprising the steps of a first layer forming step of heating cesium iodide at a temperature of not less than a melting point of the cesium iodide to evaporate the cesium iodide to form a first layer on a first support, and a second layer forming step of heating the cesium iodide at a temperature not less than the melting point of the cesium iodide to deposit the cesium iodide simultaneously with heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form a second layer on the first layer.

5. The method of producing a scintillator panel as described in the foregoing 3 or 4, wherein the coexisting compound is cesium iodide.

6. A radiation image detector comprising a light receiving element in which plural light receiving pixels are two-dimensionally arranged on a second support, and on the light receiving element, a phosphor layer comprising phosphor columnar crystals formed by a process of vapor phase deposition and containing a parent component of cesium iodide (CsI) and an activator of thallium (Tl), and the phosphor layer comprising a first layer of a CsI layer which is in a bottom portion of the phosphor layer and does not contain any activator of thallium and on the first layer, a second layer of a CsI—Tl layer which contains the activator of thallium and exhibits not more than 32% of a coefficient of variation of concentration of thallium in a direction of thickness.

7. A method of producing a radiation image detector, as described in foregoing 6, the method comprising A method of producing a radiation image detector, as claimed in claim 6, the method comprising:

a first layer forming step of heating cesium iodide at a temperature of not less than a melting point of the cesium iodide to evaporate the cesium iodide to form the first layer on the light receiving element, and a second layer forming step of heating the cesium iodide at a temperature not less than the melting point of the cesium iodide to evaporate the cesium iodide simultaneously with heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form the second layer on the first layer.

8. A method of producing a radiation image detector, the method comprising a first layer forming step of forming a light receiving element in which plural light receiving pixels are two-dimensionally arranged on a second support, and then evaporating cesium iodide with healing the cesium iodide at a temperature more than a melting point of the cesium iodide to form a first layer on the light receiving element, and a second layer forming step of heating cesium iodide at a temperature more than a melting point of cesium iodide to evaporate the cesium iodide, while simultaneously heating a mixture of cesium iodide and a coexisting compound which exhibits a melting point more than that of thallium iodide and is not reactive with thallium iodide with heating at a temperature not less than a melting point of thallium iodide and not more than that of the coexisting compound to evaporate the mixture to form a second layer on the first layer.

9. The method of producing a radiation image detector, as described in the foregoing 7 or 8, wherein the coexisting compound is cesium iodide.

Effect of the Invention

In accordance with the present invention, there can be provided a scintillator panel which has been improved in sharpness and sensitivity, a production method of the scintillator panel, and a radiation image detector and a production method of the radiation image detector.

BRIEF DESCRIPTION OF THE DRAWING

FIG. 1 shows a schematic view of a production device of a scintillator panel.

EMBODIMENTS OF THE INVENTION

Hereinafter, there will be described the embodiments of the present invention but the present invention is not limited to these.

One aspect of the present invention is directed to a scintillator panel comprising on the first support a phosphor layer which comprises phosphor columnar crystals formed by a process of vapor phase deposition and containing a parent component of cesium iodide (CsI) and an activator of thallium (Tl), and the phosphor layer comprising a first layer of a CsI layer, which is in the bottom portion of the phosphor layer and does not contain any activator of thallium, and further on the first layer, a second layer of a CsI—Tl layer, which contains the activator of thallium and in which a coefficient of variation of concentration of the activator of thallium in the direction of thickness is not more than 32%).

Specifically, in the present invention, the phosphor layer comprises phosphor columnar crystals and the phosphor columnar crystals comprise a first layer (CsI layer) which is in the bottom portion of the phosphor layer and does not contain any activator of thallium and, on the first layer, a second layer (CsI—Tl layer) exhibiting not more than 32% of a coefficient of variation of concentration of the activator of thallium in the direction of thickness, whereby a radiation image detector achieving improved sharpness and enhanced sensitivity and a scintillator panel providing it.

The scintillator panel of the present invention is used for a radiation image detector together with a light receiving element, and the radiation image detector of the present invention comprises the scintillator panel of the present invention and a light receiving element.

There is preferably used a light receiving element in which plural light receiving pixels are two-dimensionally arranged on the second support (which is also denoted as a planar light receiving element).

The preferred embodiments of the present invention include a radiation image detector provided with, on the light receiving element, the phosphor layer related to the present invention.

A phosphor layer of the scintillator panel or the radiation image detector of the present invention can be obtained, for example, by a production method described below.

Namely, the method comprises a first layer forming step of evaporating cesium iodide on the light receiving element with heating at a temperature of not less than the melting point of cesium iodide to form the first layer, and a second layer forming step of evaporating cesium iodide with heating at a temperature higher than the melting point of cesium iodide and simultaneously evaporating a mixture of thallium iodide and a coexisting compound which exhibits a melting point higher than that of thallium iodide and is not reactive with thallium iodide with heating at a temperature of not less than the melting point of cesium iodide and not more than the melting point of the coexisting compound to form a second layer on the first layer.

In one preferred embodiment of the present invention, production is conducted preferably in accordance with the conditions described below.

Using an evaporation device containing an evaporation source and a support rotation mechanism within a vacuum vessel, a support is placed onto the support rotation mechanism and a phosphor layer is formed preferably by a gas phase deposition process comprising evaporating a phosphor material, while rotating the support.

Further, in the production method, it is preferred that plural evaporation sources are disposed within the vacuum vessel and a phosphor layer is formed by the process of gas phase deposition comprising the step of evaporating two or more phosphor materials differing in composition, packed in these evaporation sources.

Hereinafter, there will be detailed the present invention and its constituent features and preferred embodiments.

Constitution of Scintillator Panel:

The scintillator panel of the present invention comprises a phosphor layer containing columnar phosphor crystals which are formed by a gas phase deposition process and comprises a parent component of cesium iodide (CsI) and an activator of thallium (Tl), and it is preferred that, in addition to a phosphor layer, there further be provided with various functional layers described later, in accordance with the purpose.

In the radiation image detector of the present invention, the scintillator panel of the present invention which is provided with, on the first support (substrate), a phosphor layer via a functional layer such as a reflection layer by a gas phase deposition process, is adhered to or brought into contact with a photoelectric conversion panel provided with a photoelectric conversion element section (planar light receiving element) in which pixels comprised of a photosensor and TFT (Thin Film Transistor) or CCD (Charge Coupled Device) are two-dimensionally arranged. Alternatively, the radiation image detector may be one in which, after forming a planar light receiving element on the second support (substrate), the phosphor layer related to the present invention is provided directly or via a functional layer such as a reflection layer or protective layer by a gas phase deposition process.

Hereinafter, there will be described, as typical examples, various constituent layers and constituent elements mainly in cases of forming a scintillator panel, but it is basically the same even in cases of forming a radiation image detector in which a planar light receiving element is formed on the second support (substrate) and then, a phosphor layer related to the present invention is directly provided.

Phosphor Layer (Scintillator Layer):

The phosphor layer (also denoted as scintillator layer) related to the present invention is a phosphor layer containing phosphor columnar crystals comprised of cesium iodide (CsI) as a parent component and thallium (Tl) as an activator.

In the present invention, it is required to contain thallium (Tl) as an activator. There may be contained an other activator material such as europium (Eu), Indium (In), lithium (Li), potassium (K), rubidium (Rb) or sodium (Na).

In the present invention, a phosphor layer can be formed by using an additive containing at least one thallium compound and cesium iodide as raw materials.

A method of forming a phosphor layer will be described later, in which there are usable various thallium compounds (compounds of thallium with an oxidation number of +I or +III).

In the present invention, a preferred thallium compound is thallium iodide (TlI).

The melting point of a thallium compound related to the present invention is preferably in the range of 400 to 700° C. A melting point not higher than 700° C. results in homogeneous inclusions of an additive within the columnar crystal, which is preferable in terms of emission efficiency. In the present invention, the melting point is at ordinary temperature and ordinary pressure.

In the scintillator layer of the present invention, the content of an additive, as described above is desirably optimized in accordance with its object or performance but is preferably from 0.001 to 50.0 mol % of cesium iodide, and more preferably from 0.1 to 10.0 mol %.

An additive content of not less than 0.001 mol % of cesium iodide results in an enhanced emission luminance obtained by cesium iodide alone, which is preferable to achieve an intended emission luminance. An additive content of not more than 50 mol % preferably makes it feasible to maintain the properties or functions of cesium iodide.

The thickness of the phosphor layer (or scintillator layer) is preferably 100 to 800 μm and more preferably 120 to 700 μm to achieve balanced characteristics of luminance and sharpness.

In the present invention, it is necessary to form the phosphor columnar crystals related to the present invention by a process of vapor phase deposition. The process of vapor phase deposition may employ a vapor deposition method, a sputtering method, a CVD method, an ion plating method and the like, and the vapor deposition method is preferred in the present invention.

The phosphor layer related to the present invention comprises cesium iodide (CsI) as a parent component and thallium (Tl) as an activator component. The phosphor layer comprises a first layer of a CsI layer which is present in the bottom portion of the phosphor layer and does not contain thallium as an activator and further on the first layer, and a second layer of a CsI—Tl layer which contains cesium iodide and thallium as an activator and in which a coefficient of variation of concentration of thallium in the direction of thickness of the second layer is not more than 32%. In the present invention, "bottom portion" (also expressed as first layer) included in the phosphor layer refers to a portion which is formed in the initial stage of the process of forming columnar phosphor crystals through gas phase deposition. Further, "layer not containing thallium" refers to a crystalline portion which does not substantially contain thallium of the phosphor columnar crystal formed by the method described earlier.

The crystalline portion which does not substantially contain thallium refers to a crystal portion which does not entirely contain thallium or not more than 1% by mass of thallium even when contained.

In the present invention, the second layer exhibits not more than 32% of a coefficient of variation of concentration of the activator in the direction of thickness, preferably not more than 30%, more preferably not more than 20%, and still more preferably not more than 10%.

In the present invention, the coefficient of variation of concentration of the activator in the thickness direction is determined in the manner described below.

The obtained phosphor layer is equally divided into 20 parts in the direction of thickness. In the case of 400 μm thick layer, for example, the layer is cut at intervals of 20 μm in the direction of its thickness, and 20 samples are collected and subjected to ICP emission spectroscopy to determine the Tl (thallium) concentration. A standard deviation is determined with respect to Tl (thallium) concentrations determined from the 20 samples and the standard deviation is divided by an average value of activator concentrations of the 20 samples to determine a coefficient of variation according to the following formula:

Coefficient of variation=(standard deviation of activator concentration in the thickness direction)/(average activator concentration).

Such crystals can be prepared basically, for example, in the manner, as described below.

First layer: Using an evaporation source including cesium iodide alone as a parent component, cesium iodide is heated at a temperature higher than its melting point to perform vapor deposition to form phosphor (CsI) crystals with an intended thickness.

Second layer: The evaporation source including only cesium iodide is heated at a temperature higher than its melting point to perform vapor deposition and simultaneously, an evaporation source containing a mixture of cesium iodide and thallium iodide as an activator component is heated at a temperature higher than the melting point of thallium iodide and lower than the melting point of cesium iodide to achieve vapor deposition to form phosphor columnar crystals (phosphor layer).

Specifically, thallium iodide greatly depends on evaporation temperature and evaporates at once when exceeding its melting point, so that, when evaporating thallium iodide alone, it is difficult to control evaporation temperature, easily resulting in nonuniform concentration distribution in its depth direction.

In the present invention, therefore, thallium iodide is mixed, in advance, with a substance (coexisting compound) exhibiting a melting point higher than that of thallium iodide and heated at a temperature lower than the melting point of the substance, whereby the temperature within the evaporation source becomes uniform and the evaporation rate of thallium iodide can be controlled, resulting in inhibition of non-uniform concentration distribution in the depth direction. The coexisting compound which is mixed with thallium iodide in advance is not limited to cesium iodide and any compound which is not reactive with thallium iodide and cesium iodide and exhibits a melting point higher than that of thallium iodide is usable, and including, for example, a metal powder and ceramic powder.

Reflection Layer:

In the present invention, there may be provided a reflection layer (also denoted as a metal reflection layer) on the support (substrate). The reflection layer reflects light emitted from a phosphor (scintillator), resulting in enhanced light-extraction efficiency. The reflection layer is preferably formed of a material containing an element selected from the group consisting of Al, Ag, Cr, Cu, Ni, Ti, Mg, Rh, Pt, and Au.

It is specifically preferred to employ a metal thin-film composed of the foregoing elements, for example, Ag film or Al film. Such a metal film may be formed of two or more layers. The thickness of a reflection layer is preferably 0.005 to 0.3 μm in terms of emission-extraction efficiency, and more preferably 0.01 to 0.2 μm.

The reflection layer related to the present invention may be formed by any method known in the art, including, for example, a sputtering treatment by use of the foregoing raw material.

Metal Protective Layer:

The scintillator panel related to the present invention may be provided, on the foregoing reflection layer (metal reflection layer), with a metal-protective layer (layer to protect the metal reflection layer).

Such a metal protective layer is formed preferably by coating a resin dissolved in a solvent and drying it. A polymer exhibiting a glass transition point of 30 to 100° C. is preferred in terms of adhesion of deposited crystals to a support (substrate) and specific examples of such a polymer include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyimide, poly-p-xylylene, poly(styrene-co-butadiene), various synthetic rubber resins, phenol resin, epoxy resin, urea resin, melamine resin, phenoxy resin, silicone resin, acryl resin and urea formamide resin. Of these, a polyester resin is preferred.

The thickness of a metal protective layer is preferably not less than 0.1 μm in terms of adhesion property and not more than 3.0 μm to achieve smoothness of the metal protective layer surface, and more preferably is in the range of 0.2 to 2.5 μm.

Examples of a solvent used for the metal protective layer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

Sublayer:

In the invention, it is preferred in terms of adhesion to provide a sublayer between the first support (substrate) and the phosphor layer, between a reflection layer and a phosphor layer or between a metal protective layer and a phosphor layer. Such a sublayer preferably contains a polymer binder (binder), a dispersing agent or the like. The thickness of a sublayer is preferably from 0.5 to 4 μm. A thickness of not less than 0.4 μm is preferable in terms of adhesion and a thickness of not more than 4 μm is preferred in terms of light scattering within the sublayer and sharpness. A sublayer thickness of not more than 5 μm is preferable in terms of inhibition of occurrence of disorder of columnar crystallinity, caused by a heat treatment. There will be further described constituents of a sublayer.

Polymer Binder:

The sublayer related to the invention is formed preferably by coating a polymer binder (hereinafter, also denoted simply as a binder) dissolved or dispersed in a solvent, followed by drying. Specific examples of such a polymer binder include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, polystyrene-co-butadiene), various synthetic rubber resins, phenol resin, epoxy resin, urea resin, melamine resin, phenoxy resin, silicone resin, acryl resin and urea formamide resin. Of these, it is preferred to employ a polyester, a vinyl chloride copolymer, polyvinyl butyral or nitrocellulose.

A polymer binder preferably is a polyurethane, a polyester, a vinyl chloride copolymer, polyvinyl butyral or nitrocellulose, in terms of adhesion. A polyester resin with a glass transition temperature (Tg) of 30 to 100° C. is specifically preferred in terms of adhesion between a deposited crystal and a support (substrate).

Examples of a solvent for use in preparation of a sublayer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

The sublayer may contain a pigment or a dye to inhibit scattering of light emitted from a phosphor (scintillator) to achieve enhanced sharpness.

Protective Layer:

In the present invention, it is preferred to provide a protective layer on a phosphor layer. A protective layer mainly aims to protect a phosphor layer. Namely, cesium iodide (CsI) is a hygroscopic material, and absorbs moisture from the atmosphere to deliquesce, so that it is a main aim to inhibit this.

The protective layer can be formed by use of various materials. For instance, it is to form a p-xylylene membrane by a CVD process. Namely, it is to form a p-xylylene layer on all of the surfaces of a scintillator and a substrate, whereby a protective layer is formed.

Alternatively, a polymer film (also called a protective film) may be provided on the phosphor layer. A material of such a polymer film may employ a film similar to a polymer film as a support (substrate) material, as described later.

The thickness of a polymer film is preferably not less than 12 μm and not more than 120 μm, and more preferably not less than 20 μm and not more than 80 μm, taking into account formability of void portions, protectiveness of a phosphor layer, sharpness, moisture resistance and workability. Taking into account sharpness, uniformity of radiation image, production stability and workability, the haze factor is preferably not less than 3% and not more than 40%, and more preferably not less than 3% and not more than 10%. The haze factor is determined by using, for example, NDH 500W, made by Nippon Denshoku Kogyo Co., Ltd. Such a haze factor can be achieved by choosing commercially available polymer films.

Taking into account photoelectric conversion efficiency and scintillator emission wavelength, the light transmittance of the protective film is preferably not less than 70% at 550 nm; however, a film with light transmittance of 99% or more is not commercially available, so that it is substantially preferred to be from 70 to 99%.

Taking into account protectiveness and deliquescence of a scintillator layer, the moisture permeability of the protective film is preferably not more than 50 g/m$^2$·day (40° C., 90% RH, measured in accordance with JIS Z 0208) and more preferably not more than 10 g/m$^2$·day (40° C., 90% RH, measured in accordance with JIS Z 0208); however, a film of not more than 0.01 g/m$^2$·day (40° C., 90% RH) is not commercially available, so that it is substantially preferred to be not less than 0.01 g/m$^2$·day (40° C., 90% RH) and not more than 50g/m$^2$·day (40° C., 90% RH, measured in accordance with JIS Z 0208), and it is more preferred to be not less than 0.1 g/m$^2$·day (40° C., 90% RH) and not more than 10 g/m$^2$·day (40° C., 90% RH, measured in accordance with JIS Z 0208).

First Support (Substrate):

In the invention, the first support (also denoted as a substrate) preferably is a quartz glass sheet, a metal sheet such as aluminum, iron, tin or chromium, a carbon fiber-reinforced sheet, or a polymer film.

There are usable polymer films (plastic films) such as cellulose acetate film, polyester film, polyethylene terephthalate film, polyamide film, polyimide film, triacetate film, polycarbonate film and carbon fiber reinforced resin. A polymer film containing a polyimide or polyethylene naphthalate is specifically suitable when forming phosphor columnar crystals with a raw material of cesium iodide by a process of vapor phase deposition.

A polymer film as the first support (substrate) related to the invention preferably is a 50-500 μm thick, flexible polymer film.

Herein, the flexible support (substrate) refers to a substrate exhibiting an elastic modulus at 120° C. (also denoted as E120) of 1000 to 6000 N/mm$^2$ Such a substrate preferably is a polymer film containing polyimide or polyethylene terephthalate.

In the region showing a linear relationship between strain and corresponding stress which is measured by using a tensile strength tester based on JIS C 2318, the elastic modulus is calculated as the slope of the straight portion of the stress-strain curve, that is, a strain divided by a stress. It is also referred to as a Young's modulus. In the present invention, such a Young's modulus is also defined as the elastic modulus.

The first support (substrate) used in the invention preferably exhibits an elastic modulus at 120° C. (E120) of 1000 to 6000 N/mm$^2$, and more preferably 1200 to 5000 N/mm$^2$.

Specific examples include polymer film comprised of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyether imide (E120=1900 N/mm$^2$), polyimide (E120=1200 N/mm$^2$), polyacrylate (E120=1700 N/mm$^2$), polysulfone (E120=1800 N/mm$^2$) or polyether sulfone (E120=1700 N/mm$^2$).

These may be used singly or mixedly, or laminated. Of these polymer films, a polymer film comprising polyimide or polyethylene naphthalate is preferred.

Adhesion of the scintillator panel to the surface of a planar light receiving element is often affected by deformation or warpage of the first support (substrate) during deposition, rendering it difficult to achieve a uniform image quality characteristic within the light receiving surface of a light receiving element. In such a case, a 50-500 μm thick polymer film is used as the support (substrate), whereby the scintillator panel is deformed with being fitted to the form of the surface of a planar light receiving element, leading to uniform sharpness over all of the light-receiving surface of the flat panel detector.

The first support may be provided with a resin layer to make the surface smooth. The resin layer preferably contains a compound such as a polyimide, polyethylene terephthalate, paraffin or graphite, and the thickness thereof preferably is approximately 5 to 50 μm. The resin layer may be provided on the front surface or back surface of the support.

Means for providing an adhesion layer on the support surface include, for example, a pasting method and a coating method. Of these, the pasting method is conducted by using heat or a pressure roller preferably in the heating condition of approximately 80 to 150° C., a pressure condition of $4.90 \times 10$ to $2.94 \times 10^2$ N/cm and a conveyance rate of 0.1 to 2.0 msec.

Production Method of Scintillator Panel:

A production method of the scintillator panel related to the invention is preferably one in which, using an evaporation device having an evaporation source and a support rotation mechanism provided within a vacuum vessel, a support is placed on the rotation mechanism and a phosphor layer is formed by a vapor phase deposition process of evaporating a phosphor material, while rotating the support rotation mechanism.

In the following, there will be described the embodiments of the invention with reference to FIG. 1.

FIG. 1 illustrates a schematic constitution of a production device of a scintillator panel usable in the present invention. As illustrated in FIG. 1, a production device 1 of a scintillator panel is provided with a vacuum vessel 2. The vacuum vessel 2 is provided with a vacuum pump 3 to evacuate the inside of the vacuum vessel 2 and to introduce atmosphere.

A support holder 5 to hold a support 4 is provided near the topside within the vacuum vessel 2.

A phosphor layer is formed on the surface of the support 4 by a process of vapor phase deposition. The process of vapor phase deposition may employ a vapor deposition method, a sputtering method, a CVD method, an ion-plating method or the like, of which the vapor deposition method is preferred in the invention.

A holder 5 supports the substrate 1 so that the support surface to form the phosphor layer is opposed to and is also parallel to the bottom face of the vacuum vessel 2.

The support holder 5 is preferably provided with a heater (which is not shown in the drawing) to heat the support 4. Heating the substrate by the heater achieves enhanced contact of the substrate to the support holder 5 and controls layer quality of the phosphor layer. Further, adsorbate on the surface of the support 4 is also eliminated or removed to inhibit generation of an impurity layer between the surface of the support 4 and a phosphor described later.

Further, there may be provided, as a heating means, a mechanism (not shown in the drawing) to circulate a warming medium or heating medium. Such a means is suitable when performing vapor deposition with maintaining the support 4 at a relatively low temperature of 50 to 150° C.

There may be provided a halogen lamp (not shown in the drawing) as a heating means. This means is suitable when performing vapor deposition with maintaining the support 4 at a relatively high temperature of not less than 150° C.

The support holder 5 is provided with a rotation mechanism 6 to rotate the support 4 in the horizontal direction. The support rotation mechanism 6 is constituted of a support rotation shaft 7 to rotating the support 4 with supporting the support holder 5 and a motor (not shown in the drawing) which is disposed outside the vacuum vessel and is a driving source of the support rotation shaft 7.

In the vicinity of the bottom surface within the vacuum vessel 2, evaporation sources 8a and 8b are disposed at positions opposed to each other on the circumference of a circle centered on a center line vertical to the support 4. In that case, the distance between the support 4 and the evaporation source 8a or 8b is preferably from 100 to 1500 mm, and more preferably from 200 to 1000 mm. Further, the distance the center line vertical to the substrate 1 and the evaporation source 8a or 8b is preferably from 100 to 1500 mm, and more preferably from 200 to 1000 mm.

The production device of a scintillator panel, usable in the present invention may be provided with three or more evaporation sources, in which the individual evaporation sources may be disposed at equivalent intervals or different intervals. The radius of a circle centered on a center line vertical to the support 4 can arbitrarily be set.

The evaporation sources 8a and 8b, which house a phosphor and heat it by a resistance heating method, may be constituted of an alumina crucible wound by a heater, a boat or a heater of a metal with a high melting point. Methods of heating a phosphor include heating by an electron beam and high-frequency induction heating, but in the invention, a method of resistance-heating by direct current or a method of resistance-heating indirectly a crucible by a circumferential heater is preferable in terms of ease of operation by a relatively simple constitution and low price and also being applicable to many substances. The evaporation sources 8a and 8b may employ a molecular-beam source by a molecular source epitaxial method.

A shutter 9 which is openable in the horizontal direction is provided between the evaporation source 8a or 8b and the substrate 1 to intercept the space from the evaporation source 8a or 8b to the support 4; this shutter 9 prevents substances except the objective material which were attached to the phosphor surface and have been evaporated at the initial stage of vapor deposition from adhering onto the support 4.

Production Method of Scintillator Panel:

Next, there will be described a production method of a scintillator panel related to the invention by using the foregoing production device 1 of the scintillator panel.

First, the support 4 is placed onto the support holder 5. Further, evaporation sources 8a and 8b are disposed on the circumference of a circle centered on a center line vertical to the substrate 1 in the vicinity of the bottom of the vacuum vessel 2. In that case, the space between the substrate 1 and the evaporation source 8a) or 8b is preferably form 100 to 1500 mm, and more preferably from 200 to 1000 mm. The space between the center line vertical to the support 4 is preferably from 100 to 1500 mm, and more preferably from 200 to 1000 mm.

Subsequently, the inside of the vacuum vessel 2 is evacuated to control the evacuation degree to the desired level. Thereafter, the support holder 5 is rotated with respect to the evaporation sources 8a and 8b by the rotation mechanism 6. When the vacuum vessel 2 reaches a vacuum degree capable of performing vapor deposition, phosphor is evaporated from the heated evaporation sources 8a and 8b, whereby the phosphor is grown to a desired thickness on the surface of the support 4.

The process of growing a phosphor on the surface of the support 4 may be divided to plural steps to form a phosphor layer.

In the vapor deposition method, a material subject to deposition (the support 4, protective layer or intermediate layer) may appropriately be heated or cooled during vapor deposition.

After completing vapor deposition, the phosphor layer may be subjected to a heating treatment. There may be also conducted a reactive deposition in which deposition is performed, while introducing gas such as $O_2$ or $H_2$.

The thickness of the formed phosphor layer, which is different depending on intended use of a radiation image detector, is from 50 to 2000 µm, preferably 50 to 1000 µm, and more preferably from 100 to 800 µm.

The temperature of the support 4 on which a phosphor layer is to be formed, is set preferably to the range of room temperature (rt) to 300° C., and more preferably 50 to 250° C.

After forming the phosphor layer, a protective layer to physically or chemically protect the phosphor layer may be provided on the phosphor layer opposite to the support 4. A coating solution for a protective layer may be directly coated onto the phosphor layer surface or a protective layer which was previously formed may be adhered to the phosphor layer. The thickness of such a protective layer is preferably from 0.1 µm to 2000 µm.

Alternatively, a protective layer may be formed by depositing an inorganic substance such as SiC, $SiO_2$, SiN or $Al_2O_3$ through a vapor deposition method, sputtering method or the like.

In the invention, there may be provided various functional layers other than the protective layer.

In the production device 1 for a scintillator panel or the production method thereof plural evaporation sources 8a and 8b are provided, whereby the overlapping portion of vapor streams from evaporation sources 8a and 8b are straightened, resulting in uniform crystallinity of a phosphor deposited on the surface of the support 4. In that case, more evaporation sources are provided, vapor streams are straightened at a larger number of portions, resulting in uniform crystallinity over a broader region. Further, when evaporation sources 8a and 8b are disposed on the circumference of a circle entered on a center line vertical to the support 4, such an action of uniformalizing crystallinity by straightening vapor streams can be isotropically achieved on the surface of the support 4.

Further, performing deposition of a phosphor with rotating the support 4 by the support rotation mechanism 6 can achieve uniform deposition of the phosphor on the surface of the support 4.

In the production device 1 or the production method of the scintillator panel related to the invention, as described above, the phosphor layer is allowed to grow so that the crystallinity of the phosphor becomes uniform, thereby achieving enhanced sharpness in the radiation image obtained from the radiation image detector by using the scintillator panel related to the invention.

Further, restriction of the incident angle of the foregoing phosphor to be deposited on the support 4 to the prescribed region to inhibit fluctuation in the incident angle of the phosphor results in uniformity crystallinity of the phosphor and enhanced sharpness of the obtained radiation image.

In the foregoing there are described cases when the support holder 5 is provided with the support rotation mechanism 6, but the invention is not limited to these but is also applicable to those cases, including, for example, the case of performing evaporation, while the support holder 5 holding the support 4 at rest; and the case of depositing the phosphor from the evaporation source 8a or 8b, while the support 4 is in the horizontal direction to the evaporation source 8a or 8b.

Radiation Image Detector:

The radiation image detector of the present invention (also denoted as a radiation image conversion panel or radiation flat panel detector) may be obtained by adhering or contacting a scintillator panel which is provided with a phosphor layer formed on the first support (substrate) by the vapor phase deposition process through a functional layer such as a reflection layer, to a photoelectric conversion panel provided, on the second substrate, with a photoelectric conversion element section (or planar light receiving element) in which picture elements comprised of a photosensor and a TFT (Thin Film Transistor) or CCD (Charge Coupled Device) are two-dimensionally arranged. Alternatively, it may be obtained by forming the photoelectric conversion element section in which picture elements comprised of a photosensor and a TFT or CCD are two-dimensionally arranged, followed by providing the phosphor layer related to the present invention by the process of vapor phase deposition directly or through a functional layer such as a reflection layer or a protective layer.

Namely, the radiation image detector of the present invention is required to be one which is provided, as a basic constitution, with a phosphor layer and a light-receiving element (hereinafter, also denoted as a planar light-receiving element) in which plural light-receiving elements are two-dimensionally arranged. Accordingly, the planar light-receiving element converting emission from the phosphor layer to a charge makes it feasible to digitize the image data.

The second support used for the planar light-receiving element includes the first support used for the scintillator panel of the present invention, and preferred examples thereof include a quartz glass sheet, a metal sheet of aluminum, iron, tin or chromium, a carbon fiber reinforced sheet and a polymer film.

The surface mean roughness (Ra) of the planar light-receiving surface of the light-receiving element related to the invention is preferably within the range of 0.001 to 0.5 µm. Accordingly, it is preferred that after forming a light-receiving element on the glass surface, an organic resin film such as polyester of acryl is formed on the surface and the surface roughness is controlled by a photo-etching method so that the relevant requirements are met. The surface mean roughness (Ra) of the planar light receiving element related to the invention is preferably 0.001 to 0.1 µm, and more preferably 0.001 to 0.05 µm.

The radiation image detector of the present invention is preferably in the form of a scintillator panel being contactably pressed to a planar light-receiving element by an elastic member (such as a sponge, spring or the like). It is also a preferred embodiment that the scintillator panel is brought into contact with the planar light-receiving element by evacuating the space between the scintillator panel and the planar light-receiving element and the circumference is sealed with an adhesive sealing member. Such an adhesive sealing member preferably is an ultraviolet-curable resin.

It is also a preferred embodiment that the scintillator panel is provided with a phosphor layer and the phosphor layer is directly in contact with a planar light-receiving element.

Such ultraviolet-curable resins are not specifically restricted but can be selected appropriately from those known in the art. These ultraviolet-curable resins contain a photopolymerizable prepolymer or photopolymerizable monomer and a photopolymerization initiator or a photosensitizer.

Examples of such a photopolymerizable prepolymer include a polyester-acrylate one, an epoxy-acrylate one, a urethane acrylate one and a polyol-acrylate one. These photopolymerizable pre-polymers may be used singly or in combination. Examples of a photopolymerizable monomer include polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

In the invention, there are preferably used a urethane acrylate prepolymer and a dipentaerythritol hexa(meth)acrylate monomer.

Examples of a photopolymerization initiator include acetophenones, benzophenones, α-amyloxime ester, tetramethyl-thiurum monosulfide, and thioxanthones. Further, n-butylamine, triethylamine and poly-n-butylphosphine are mixedly used as a photosensitizer.

EXAMPLES

The present invention will be further described with reference to examples but the embodiments of the present invention are by no means limited to these examples.

Example 1

A scintillator panel was prepared in the following manner by using the production device shown in FIG. 1.

Preparation of Scintillator Panel 1 (Comparative Example)

Evaporation material A as a phosphor raw material 1 (CsI:TlI=1:0.003 mole) and evaporation material A as a phosphor raw material 2 (CsI:TlI=1:0.003 mole) were vapor-deposited onto one surface side of a support comprised of a polyimide resin sheet (thickness: 125 μm) to form a phosphor layer.

Specifically, first, a support is placed on a support holder provided with a support rotation mechanism. Then, the foregoing phosphor raw materials were respectively placed in a single evaporation source crucible (two crucibles in total). Two evaporation source crucibles were each disposed in the vicinity of the bottom of the vacuum vessel and on the circumference of a circle centered on a center line vertical to the support. The distance between the support and the evaporation source was adjusted to 400 mm and the distance between the center line vertical to the support and the evaporation source was also adjusted to 400 mm. Subsequently, after the interior of the vacuum vessel was evacuated, the vacuum degree was adjusted to 0.1 Pa, while introducing Ar gas and the temperature of the support was maintained at 30° C., while rotating the support at a rate of 10 rpm.

Subsequently, the interior of crucible was raised to 700° C. by resistance heating and then evaporation of the phosphor raw material 1 was initiated with rotating the support and when the thickness of the phosphor layer reached 30 μm, evaporation was terminated to form the first phosphor layer (thickness: 30 μm).

Subsequently, after the temperature of the support (substrate) was raised to 200° C. by a halogen lamp disposed on the backside of the substrate holder, the interior of the crucible was heated to 700° C. by the halogen lamp disposed at the backside of the substrate holder and phosphor raw material 2 was evaporated, while rotating the support. When the thickness of a phosphor layer reached 430 μm, evaporation was terminated to form a second phosphor layer (thickness: 400 μm). Subsequently, the phosphor layer was placed into a protective bag [protective bag formed of laminated film of polyethylene terephthalate (PET) film and casting polypropylene (CPP) film] in a dry air atmosphere and the circumference was fused to be sealed by using an impulse sealer, whereby scintillator panel 1 (comparative example) in which the phosphor layer was sealed.

Preparation of Scintillator Panel 2 (Comparative Example)

Scintillator panel 2 (comparative example) was prepared in the same manner as in preparation of the foregoing scintillator panel 1 (comparative example), except that the phosphor raw material 1 was replaced by evaporation material B (CsI alone).

Preparation of Scintillator Panel 3 (Comparative Example)

Scintillator panel 3 (comparative example) was prepared in the same manner as in preparation of the foregoing scintillator panel 2 (Comparative example), except that the phosphor raw material 2 was equally divided to eight parts, which were arranged on the same circumference and evaporation was performed.

Preparation of Scintillator Panel 4 (Comparative Example)

The temperature of a support (substrate) was raised to 200° C. similarly to preparation of scintillator panel 2 (comparative example) and then, an evaporation source of phosphor raw material 1 was heated to 700° C. and another evaporation source, in which the composition of phosphor raw material 2 was changed to (CsI:Tl=1:0.01 mol), that is, evaporation material A was altered to evaporation C (CsI:Tl=1:0.01 mol), was heated to 700° C. and these evaporation sources were simultaneously heated to initiate evaporation. When the thickness of the phosphor layer reached 430 μm, evaporation was terminated to prepare a second phosphor layer (thickness: 400 μm). Subsequently, the thus prepared phosphor layer was placed into a protective bag in a dry air atmosphere to obtain scintillator panel 4 (comparative example) in which the phosphor layer was sealed.

Preparation of Scintillator Panel 5 (Inventive Example)

The support (substrate) was heated to 200° C. similarly to preparation of scintillator panel 2 (comparative example) and then, an evaporation source of phosphor raw material 1 was heated to 700° C. and another evaporation source, in which the composition of phosphor raw material 2 was changed to (CsI:Tl=1:0.01 mol), that is, evaporation material A was altered to evaporation C (CsI:Tl=1:0.01 mol), was heated to 500° C., at which CsI was not evaporated and only TlI was evaporated and these evaporation sources were simultaneously heated to initiate evaporation. When the thickness of the phosphor layer reached 430 μm, evaporation was terminated to prepare a second phosphor layer (thickness: 400 μm). Subsequently, the thus prepared phosphor layer was placed into a protective bag in a dry air atmosphere to obtain scintillator panel 5 (inventive example) in which the phosphor layer was sealed.

Preparation of Scintillator Panel 6 (Inventive Example)

Scintillator panel 6 (inventive example) having a phosphor layer sealed was prepared similarly to the foregoing preparation of scintillator panel 5 (inventive example), provided that the temperature of a support (substrate) was raised to 200° C. but the number of evaporation sources was altered from one to two.

Preparation of Scintillator Panel 7 (Inventive Example)

Scintillator panel 7 (inventive example) having a sealed phosphor layer was prepared similarly to the foregoing preparation of scintillator panel 5 (inventive example), provided that the temperature of a support (substrate) was raised to 200° C. but the number of evaporation sources was altered from one to four.

Preparation of Scintillator Panel 8 (Inventive Example)

Scintillator panel 8 (inventive example) having a phosphor layer sealed was prepared similarly to the foregoing preparation of scintillator panel 5 (inventive example), provided that the temperature of a support (substrate) was raised to 200° C. but the number of evaporation sources was altered from one to eight.

Preparation of Scintillator Panel 9 (Inventive Example)

Scintillator panel 9 (inventive example) having a phosphor layer sealed was prepared similarly to the foregoing preparation of scintillator panel 5 (inventive example), provided that the temperature of a support (substrate) was raised to 200° C. but the number of evaporation sources was altered from one to sixteen.

Preparation of Scintillator Panel 10 (Inventive Example)

Scintillator panel 10 (Inventive example) having a phosphor layer sealed was prepared similarly to the foregoing preparation of scintillator panel 5 (Inventive example), provided that the temperature of a support (substrate) was raised to 200° C. but the number of evaporation sources was altered from one to thirty-two.

Coefficient of Variation of Activator Concentration:

A coefficient of variation of activator concentration in the thickness direction of a phosphor layer is determined as follows:

When the second layer of a phosphor layer of an obtained scintillator panel is 400 μm, 20 samples are collected in the thickness direction and measured by emission spectroscopy with respect to Tl (thallium) concentration, a standard deviation is determined with respect to Tl concentrations of the foregoing 20 samples, and a coefficient of variation (relative coefficient of variation) which is the standard deviation divided by an average of activator concentrations of the 20 samples, as represented by the following expression (2):

Coefficient of variation=standard deviation of activator concentration in thickness direction/average of activator concentration.

Evaluation:

The obtained scintillator panels were each set, as a radiation image detector, into Pax Scan 2520 (FPD produced by Varian Corp.) and evaluated as below.

Luminance:

Samples were each exposed to X-rays at a voltage of 80 kVp from the back surface (not having a scintillator layer) and the image data were detected by the FPD (flat panel type radiation detector) disposed with the scintillator, and the average signal value of the image was defined as the emission luminance. The thus obtained luminance was presented by a relative value, based on the luminance of radiation image detector 1 being 100, as shown in Table 2. A higher MTF value (sensitivity) indicates superior luminance.

Sharpness:

Evaluation of Sharpness:

The FPD was exposed to X-rays at a tube voltage of 80 kVp through a lead MTF chart and the image data was recorded on a hard disc. Then, the record on the hard disc was analyzed by a computer to determine a modulation transfer function, MTF [MTF value at a spatial frequency cycle of 1/mm], which was a measure of sharpness. The obtained MTF was represented by a relative value, based on the MTF of the radiation image detector 1 being 100. A higher MTF value indicates being excellent in sharpness. "MTF" is the abbreviation for Modulation Transfer Function, Results are shown in Tables 1 and 2.

TABLE 1

Radiation Image Detector

Scintillator Panel

Columnar Phosphor Crystal of Phosphor Layer

| | | First Layer | | Second Layer | | | | |
|---|---|---|---|---|---|---|---|---|
| No | No. | Phosphor Raw Material 1 Deposit Material Composition (molar ratio). No. of Evaporation Sources. Evaporation Source Temperature. | Composition of First Layer obtained | Phosphor Raw Material 1 Deposit Material Composition (molar ratio). No. of Evaporation Sources. Evaporation Source Temperature. | Phosphor Raw Material 2 Deposit Material Composition (molar ratio). No. of Evaporation Sources. Evaporation Source Temperature. | Composition of Second Layer obtained | Coefficient of Variation of Tl (%) | Remark |
| 1 | 1 | A (CsI:Tl = 1:0.003) 1 700° C. | CsI:Tl = 1:0.003 | none | A (CsI:Tl = 1:0.003) 1 700° C. | CsI:Tl = 1:0.003 | 45 | Comp. |
| 2 | 2 | B (CsI only) 1 700° C. | CsI only | none | A (CsI:Tl = 1:0.003) 1 700° C. | CsI:Tl = 1:0.003 | 46 | Comp. |
| 3 | 3 | B (CsI only) 1 700° C. | CsI only | B (CsI only) 1 700° C. | A (CsI:Tl = 1:0.003) 8 700° C. | CsI:Tl = 1:0.003 | 42 | Comp. |

TABLE 1-continued

Radiation Image Detector

Scintillator Panel

Columnar Phosphor Crystal of Phosphor Layer

| | | First Layer | | Second Layer | | | | |
|---|---|---|---|---|---|---|---|---|
| No | No. | Phosphor Raw Material 1 Deposit Material Composition (molar ratio). No. of Evaporation Sources. Evaporation Source Temperature. | Composition of First Layer obtained | Phosphor Raw Material 1 Deposit Material Composition (molar ratio). No. of Evaporation Sources. Evaporation Source Temperature. | Phosphor Raw Material 2 Deposit Material Composition (molar ratio). No. of Evaporation Sources. Evaporation Source Temperature. | Composition of Second Layer obtained | Coefficient of Variation of Tl (%) | Remark |
| 4 | 4 | B (CsI only) 1 700° C. | CsI only | B (CsI only) 1 700° C. | A (CsI:Tl = 1:0.01) 1 700° C. | CsI:Tl = 1:0.01 | 42 | Comp. |
| 5 | 5 | B (CsI only) 1 700° C. | CsI only | B (CsI only) 1 700° C. | C (CsI:Tl = 1:0.01) 1 500° C. | CsI:Tl = 1:0.01 | 32 | Inv. |
| 6 | 6 | B (CsI only) 1 700° C. | CsI only | B (CsI only) 2 700° C. | C (CsI:Tl = 1:0.01) 1 500° C. | CsI:Tl = 1:0.01 | 28 | Inv. |
| 7 | 7 | B (CsI only) 1 700° C. | CsI only | B (CsI only) 4 700° C. | C (CsI:Tl = 1:0.01) 1 500° C. | CsI:Tl = 1:0.01 | 17 | Inv. |
| 8 | 8 | B (CsI only) 1 700° C. | CsI only | B (CsI only) 8 700° C. | C (CsI:Tl = 1:0.01) 1 500° C. | CsI:Tl = 1:0.01 | 9 | Inv. |
| 9 | 9 | B (CsI only) 1 700° C. | CsI only | B (CsI only) 16 700° C. | C (CsI:Tl = 1:0.01) 1 500° C. | CsI:Tl = 1:0.01 | 4 | Inv. |
| 10 | 10 | B (CsI only) 1 700° C. | CsI only | B (CsI only) 32 700° C. | C (CsI:Tl = 1:0.01) 1 500° C. | CsI:Tl = 1:0.01 | 2 | Inv. |

TABLE 2

| Radiation Image Detector No. | Scintillator Panel No. | Coefficient of Variation (%) of Tl | Luminance (relative value) | MTF (relative value) | Remark |
|---|---|---|---|---|---|
| 1 | 1 | 45 | 100 | 100 | Comp. |
| 2 | 2 | 46 | 95 | 110 | Comp. |
| 3 | 3 | 42 | 99 | 109 | Comp. |
| 4 | 4 | 42 | 98 | 108 | Comp. |
| 5 | 5 | 32 | 105 | 112 | Inv. |
| 6 | 6 | 28 | 117 | 113 | Inv. |
| 7 | 7 | 17 | 118 | 115 | Inv. |
| 8 | 8 | 9 | 120 | 119 | Inv. |
| 9 | 9 | 4 | 121 | 122 | Inv. |
| 10 | 10 | 2 | 122 | 123 | Inv. |

As is apparent from the results shown Tables, any one of scintillator panels related to the present invention, in which a coefficient of variation of Tl concentration in the direction of thickness was not more than 32%, was excellent in luminance and MTF.

On the contrary, scintillator panels of comparative examples, in which a coefficient of variation of Tl concentration in the direction of thickness was more than 32%, were inferior in luminance and MTF. In light of the foregoing results, it was proved that a coefficient of variation of Tl concentration in the thickness direction is not more than 32%, preferably not more than 30%, more preferably not more than 20% and still more preferably not more than 10%.

Example 2

Plural photodiodes and plural TFT elements were formed on a glass substrate and were entirely covered with a protective layer composed of an epoxy resin. On the protective layer, a phosphor layer 1 was formed similarly to the scintillator panel 1 of EXAMPLE 1. Thereafter, a moisture-resistant protective layer (20 μm) composed of polyp-xylene), a reflection layer (20 nm) composed of aluminum and a protective layer (100 μm) composed of an epoxy resin were formed on the scintillator layer, whereby a radiation image detector 11 was obtained.

Radiation Image Detector 11-20:

Radiation image detectors 12 to 20 were obtained in the same manner as radiation image detector 11, except that the phosphor layer 1 of the radiation image detector 11 was replaced by each of phosphor layers of scintillator panels 2 to 10 in EXAMPLE 1.

The thus obtained radiation image detectors were evaluated in the same manner as in EXAMPLE 1.

Results thereof are shown in Tables 3 and 4.

TABLE 3

| | | Radiation Image Detector | | | | | | |
|---|---|---|---|---|---|---|---|---|
| | | Scintillator Panel | | | | | | |
| | | Columnar Phosphor Crystal of Phosphor Layer | | | | | | |
| | | First Layer | | Second Layer | | | | |
| No | No. | Phosphor Raw Material 1 Deposit Material Composition (molar ratio). No. of Evaporation Sources. Evaporation Source Temperature. | Composition of First Layer obtained | Phosphor Raw Material 1 Deposit Material Composition (molar ratio). No. of Evaporation Sources. Evaporation Source Temperature. | Phosphor Raw Material 2 Deposit Material Composition (molar ratio). No. of Evaporation Sources. Evaporation Source Temperature. | Composition of Second Layer obtained | Coefficient of Variation of Tl (%) | Remark |
| 11 | 11 | A (CsI:Tl = 1:0.003) 1 700° C. | CsI:Tl = 1:0.003 | none | A (CsI:Tl = 1:0.003) 1 700° C. | CsI:Tl = 1:0.003 | 44 | Comp. |
| 12 | 12 | B (CsI only) 1 700° C. | CsI only | none | A (CsI:Tl = 1:0.003) 1 700° C. | CsI:Tl = 1:0.003 | 46 | Comp. |
| 13 | 13 | B (CsI only) 1 700° C. | CsI only | B (CsI only) 1 700° C. | A (CsI:Tl = 1:0.003) 8 700° C. | CsI:Tl = 1:0.003 | 42 | Comp. |
| 14 | 14 | B (CsI only) 1 700° C. | CsI only | B (CsI only) 1 700° C. | A (CsI:Tl = 1:0.01) 1 700° C. | CsI:Tl = 1:0.01 | 44 | Comp. |
| 15 | 15 | B (CsI only) 1 700° C. | CsI only | B (CsI only) 1 700° C. | C (CsI:Tl = 1:0.01) 1 500° C. | CsI:Tl = 1:0.01 | 32 | Inv. |
| 16 | 16 | B (CsI only) 1 700° C. | CsI only | B (CsI only) 2 700° C. | C (CsI:Tl = 1:0.01) 1 500° C. | CsI:Tl = 1:0.01 | 26 | Inv. |
| 17 | 17 | B (CsI only) 1 700° C. | CsI only | B (CsI only) 4 700° C. | C (CsI:Tl = 1:0.01) 1 500° C. | CsI:Tl = 1:0.01 | 16 | Inv. |
| 18 | 18 | B (CsI only) 1 700° C. | CsI only | B (CsI only) 8 700° C. | C (CsI:Tl = 1:0.01) 1 500° C. | CsI:Tl = 1:0.01 | 8 | Inv. |
| 19 | 19 | B (CsI only) 1 700° C. | CsI only | B (CsI only) 16 700° C. | C (CsI:Tl = 1:0.01) 1 500° C. | CsI:Tl = 1:0.01 | 4 | Inv. |
| 20 | 20 | B (CsI only) 1 700° C. | CsI only | B (CsI only) 32 700° C. | C (CsI:Tl = 1:0.01) 1 500° C. | CsI:Tl = 1:0.01 | 2 | Inv. |

TABLE 4

| Radiation Image Detector No. | Scintillator Panel No. | Coefficient of Variation (%) of Tl | Luminance (relative value) | MTF (relative value) | Remark |
|---|---|---|---|---|---|
| 11 | 11 | 44 | 100 | 100 | Comp. |
| 12 | 12 | 46 | 96 | 110 | Comp. |
| 13 | 13 | 42 | 100 | 108 | Comp. |
| 14 | 14 | 44 | 101 | 107 | Comp. |
| 15 | 15 | 32 | 106 | 114 | Inv. |
| 16 | 16 | 26 | 119 | 115 | Inv. |
| 17 | 17 | 16 | 120 | 116 | Inv. |
| 18 | 18 | 8 | 121 | 121 | Inv. |
| 19 | 19 | 4 | 122 | 123 | Inv. |
| 20 | 20 | 2 | 123 | 124 | Inv. |

As is apparent from the results shown in the Tables, any one of scintillator panels related to the present invention, in which a coefficient of variation of Tl concentration in the direction of thickness was not more than 32%, was excellent in luminance and MTF.

On the contrary, scintillator panels of comparative examples, in which a coefficient of variation of Tl concentration in the direction of thickness was more than 32%, were inferior in luminance and MTF. In light of the foregoing results, it was proved that a coefficient of variation of Tl concentration in the direction of thickness is not more than 32%, preferably not more than 30%, more preferably not more than 20% and still more preferably not more than 10%.

Description of the Numerals

| | |
|---|---|
| 1: | Production device of scintillator panel |
| 2: | Vacuum vessel |
| 3: | Vacuum pump |
| 4: | Support |
| 5: | Support holder |
| 6: | Support rotation mechanism |
| 7: | Support rotation shaft |
| 8a: | Evaporation source |
| 8b: | Evaporation source |
| 9: | Shutter |

What is claimed is:

1. A scintillator panel comprising on a first support a phosphor layer comprising phosphor columnar crystals formed by a process of vapor phase deposition and containing a parent component of cesium iodide (CsI) and an activator of thallium (Tl), and the phosphor layer comprising a first layer of a CsI layer which is in a bottom portion of the phosphor layer and does not contain any activator of thallium and on the first layer, a second layer of a CsI—Tl layer which contains the activator of thallium and exhibits not more than 32% of a coefficient of variation of concentration of thallium in a direction of thickness.

2. A radiation image detector comprising a scintillator panel, as claimed in claim 1 and a light receiving element.

3. A method of producing a scintillator panel, as claimed in claim 1, the method comprising:
- a first layer forming step of heating cesium iodide at a temperature of not less than a melting point of the cesium iodide to evaporate the cesium iodide to form the first layer on the first support, and
- a second layer forming step of heating the cesium iodide at a temperature not less than the melting point of the cesium iodide to evaporate the cesium iodide, while simultaneously heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form the second layer on the first layer.

4. The method of producing a scintillator panel as claimed in claim 3, wherein the coexisting compound is cesium iodide.

5. A method of producing a scintillator panel comprising the steps of:
- a first layer forming step of heating cesium iodide at a temperature of not less than a melting point of the cesium iodide to evaporate the cesium iodide to form a first layer on a first support, and
- a second layer forming step of heating the cesium iodide at a temperature not less than the melting point of the cesium iodide to evaporate the cesium iodide, while simultaneously heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form a second layer on the first layer.

6. The method of producing a scintillator panel as claimed in claim 5, wherein the coexisting compound is cesium iodide.

7. A radiation image detector comprising a light receiving element in which plural light receiving pixels are two-dimensionally arranged on a second support, and on the light receiving element, a phosphor layer comprising phosphor columnar crystals formed by a process of vapor phase deposition and containing a parent component of cesium iodide (CsI) and an activator of thallium (Tl), and the phosphor layer comprising a first layer of a CsI layer which is in a bottom portion of the phosphor layer and does not contain any activator of thallium and on the first layer, a second layer of a CsI—Tl layer which contains the activator of thallium and exhibits not more than 32% of a coefficient of variation of concentration of thallium in a direction of thickness.

8. A method of producing a radiation image detector, as claimed in claim 7, the method comprising:
- a first layer forming step of heating cesium iodide at a temperature of not less than a melting point of the cesium iodide to evaporate the cesium iodide to form the first layer on the light receiving element, and
- a second layer forming step of heating the cesium iodide at a temperature not less than the melting point of the cesium iodide to evaporate the cesium iodide, while simultaneously heating a mixture of thallium iodide and a coexisting compound which exhibits a melting point higher than that of the thallium iodide and is non-reactive with the thallium iodide at a temperature of not less than a melting point of the thallium iodide and not more than a melting point of the coexisting compound to evaporate the mixture to form the second layer on the first layer.

9. The method of producing a radiation image detector, as claimed in claim 8, wherein the coexisting compound is cesium iodide.

10. A method of producing a radiation image detector, the method comprising:
- a first layer forming step of forming a light receiving element in which plural light receiving pixels are two-dimensionally arranged on a second support, and then evaporating cesium iodide with heating the cesium iodide at a temperature more than a melting point of the cesium iodide to form a first layer on the light receiving element, and
- a second layer forming step of heating cesium iodide at a temperature more than a melting point of cesium iodide to evaporate the cesium iodide, while simultaneously heating a mixture of cesium iodide and a coexisting compound which exhibits a melting point more than that of thallium iodide and is not reactive with thallium iodide with heating at a temperature not less than a melting point of thallium iodide and not more than that of the coexisting compound to evaporate the mixture to form a second layer on the first layer.

11. The method of producing a radiation image detector, as claimed in claim 10, wherein the coexisting compound is cesium iodide.

* * * * *